United States Patent [19]

Murrell et al.

[11] Patent Number: 4,692,428

[45] Date of Patent: Sep. 8, 1987

[54] PREPARATION AND USE OF CATALYSTS COMPRISING MIXTURES OF TUNGSTEN OXIDE AND SILICA ON ALUMINA

[75] Inventors: Lawrence L. Murrell, South Plainfield; Nicholas C. Dispenziere, Jr., Wall; Richard S. Polizzotti, Milford, all of N.J.

[73] Assignee: Exxon Research and Engineering Company, Florham Park, N.J.

[21] Appl. No.: 815,201

[22] Filed: Dec. 31, 1985

[51] Int. Cl.[4] .......................... B01J 23/30; B01J 21/12
[52] U.S. Cl. ..................................... 502/254; 502/263
[58] Field of Search ................................ 502/254, 263

[56] References Cited

U.S. PATENT DOCUMENTS

| | | | |
|---|---|---|---|
| 3,365,513 | 1/1968 | Heckelsberg | 502/254 |
| 3,454,653 | 7/1969 | Larson | 502/254 |
| 4,269,737 | 5/1981 | Grenoble et al. | 502/254 |
| 4,301,036 | 11/1981 | Childress et al. | 502/254 |
| 4,537,875 | 8/1985 | Toulhoat et al. | 502/254 |

*Primary Examiner*—Carl F. Dees
*Attorney, Agent, or Firm*—Edward M. Corcoran; Joseph J. Dvorak

[57] ABSTRACT

Useful cracking catalysts and catalyst supports comprising mixtures of tungsten oxide and silica supported on alumina are prepared by forming a composite of a mixture of (a) particles of tungsten oxide or one or more suitable tungsten oxide precursors, (b) particles of silica and (c) particles of porous alumina and steaming said composite at a temperature of at least about 500° C. in a non-reducing environment for a time sufficient for at least a portion of the tungsten oxide and silica to disperse over the alumina surface. The mixture of silica and tungsten oxide wets, spreads out and reacts with the surface hydroxyl groups of the alumina.

12 Claims, No Drawings

% 1

PREPARATION AND USE OF CATALYSTS COMPRISING MIXTURES OF TUNGSTEN OXIDE AND SILICA ON ALUMINA

BACKGROUND OF THE INVENTION

1. Field of the Invention

This invention relates to the preparation and use of catalysts comprising mixtures of tungsten oxide and silica supported on alumina. More particularly, this invention relates to the preparation and use of catalyst-supports and cracking catalysts comprising mixtures of tungsten oxide and silica supported on alumina which are prepared by forming a composite of a mixture of (a) particles of tungsten oxide or one or more suitable tungsten oxide precursors, (b) particles of silica and (c) particles of alumina and subjecting said composite to high temperature steaming at a temperature of at least about 500° C. for a time sufficient for at least a portion of the silica and tungsten oxide to react with the surface of the alumina.

2. Background of the Disclosure

The use of silica-alumina composites as catalysts and as catalyst support materials is well known to those skilled in the art. These catalysts are prepared in many different ways such as co-precipitation, various co-gel techniques, by contacting alumina with various silica precursor salts such as organo-silanes, including alkoxy silanes followed by calcination of the so-formed composite to produce the desired silica-alumina material. Use of the latter techniques enables one to obtain an alumina whose surface is partly or completely covered with silica as opposed to a homogeneous or heterogeneous silica-alumina composite.

U.S. Pat. No. 4,440,872 to Grenoble et al. discloses various acid cracking catalysts. Some of the catalyst supports are prepared by impregnating gamma alumina with a silane compound followed by either calcining or steaming the impregnate at 500° C. The calcined support material is then impregnated with ammonium meta tungstate which is steamed at high temperatures to form a catalyst.

Peters et al. in U.S. Pat. No. 3,671,432 disclose a process for preparing a supported transition metal of Group V or VI of the Periodic Table which includes mixing a water dispersible transition metal compound with particles of support material and calcining the mixture at a temperature of from 200°-1000° C. However, the disclosure contains examples employing only either chromium trioxide or vanadium pentoxide as the water dispersible transition metal compounds.

U.S. Pat. No. 3,668,151 mixes particulate zinc oxide with particulate gamma alumina and calcines the mixture at 600°-1500° C.

Browning et al. in U.S. Pat. No. 3,182,012 prepare a cracking catalyst comprising cobalt and molybdenum on a silica-alumina support. The silica and alumina may be mixed as dry powders, but the cobalt and molybdenum are deposited on the support by impregnation. The final impregnate is calcined at 600°-1200° F.

In U.S. Pat. No. 2,830,960 Broomhead mixes cobalt formate, molybdic acid and an alumina hydrogel, followed by drying and calcining the mixture at 450°-650° C. Porter et al. in U.S. Pat. No. 2,640,802 disclose mixing powdered cobalt oxide, molybdic oxide and alumina, pelleting the mixture and heating the pellets for two hours at 530° C. U.S. Pat. No. 3,151,091 discloses preparing alumina based catalysts by dry mixing alumina with an oxide of a metal selected from the group consisting of the iron transition metals, molybdenum, tungsten, vanadium and mixtures thereof and calcining the resulting mixture at 800°-1200° F.

U.S. Pat. No. 2,394,796 discloses impregnating a porous, hydrated alumina, including boehmite, with silicon tetrachloride or tetraethylsilicate, followed by hydrolysis of the impregnate to form silica. In U.S. Pat. No. 2,493,896 an alumina support material is impregnated with ethylsilicate or a polymer of ethylsilicate, followed by calcination. Multiple impregnations, with calcining after each impregnation, are said to yield a catalyst containing up to 50 wt. % silica. In U.S. Pat. No. 4,172,809 a process for preparing alumina extrudates is disclosed wherein a silicon compound is added to an alumina gel during extrusion of the gel. The resulting extrudate is then calcined.

U.S. Pat. No. 2,579,123 discloses reactivating deactivated silica-alumina catalysts by impregnating with a silicon or silicate compound, followed by calcination.

U.S. Pat. No. 3,502,595 discloses the preparation of silica-alumina catalysts by impregnating a hydrated alumina, including boehmite, with one or more organic esters of silicon followed by calcination. U.S. Pat. No. 4,038,337 discloses the preparation of a silica-alumina catalyst by reacting gamma or eta alumina with various esters of orthosilicic acid, followed by calcination.

U.S. Pat. No. 4,013,589 discloses a process for improving the mechanical and thermal properties (stability) of gamma alumina by impregnating the alumina with a hydrolyzable silicone compound and hydrolyzing the impregnate to convert the silicone compound to silica. Temperatures of up to 500° C. are employed for the hydrolyzing step. In one example, a negative comparative example, the alumina was impregnated with a "Ludox" slurry (a solution of colloidal silica) followed by calcination in air at 500° C.

U.S. Pat. No. 4,080,284 discloses contacting a support material, such as alumina, with an organic or halogen-substituted silane. The silylated support material is then calcined, followed by steaming at 900°-1600° F.

SUMMARY OF THE INVENTION

It has now been discovered that useful cracking catalysts and catalyst supports comprising a mixture of silica and tungsten oxide supported on alumina can be prepared by compositing particles of alumina with a mixture of (a) particles of silica, (b) a tungsten oxide precursor compound, particles of tungsten oxide or mixture thereof and heating the composite at a temperature of at least about 500° C. in a nonreducing environment and in the presence of steam for a time sufficient for at least a portion of the silica and tungsten oxide to react with the surface of the alumina. In a preferred embodiment of the process of this invention the steaming temperature will be at least about 700° C. and the silica and tungsten oxide will also spread out, wet and disperse over at least a portion of the alumina surface.

In one embodiment the alumina will be porous possessing both external and internal surface and the silica and tungsten oxide will spread out, wet and disperse over at least a portion of both the external and internal surface of the porous alumina particles.

DETAILED DESCRIPTION

In the process of this invention, the high temperature steaming treatment causes the mixture of silica and tungsten oxide to react with the surface of the alumina. In the event that a suitable tungsten oxide precursor is present in the mixture, the steaming will first convert the percursor to tungsten oxide after which the tungsten oxide reacts with the surface of the alumina. While not wishing to be held to any particular theory, those skilled in the art know that alumina is not simply represented by the formula $Al_2O_3$. Instead, the alumina is usually in the form of a hydrate in the sense that it contains varying amounts of water which can be removed at elevated (and usually considerably elevated) temperatures. In large part, the "hydrates" are manifested as surface hydroxyl groups, which themselves are important modifiers of the surface properties of alumina. It is believed that these surface hydroxyls on the alumina react with the silica and the tungsten oxide with the formation of an oxygen-silica bond and an oxygen-tungsten oxide bond, such that two oxygens of the hydroxyls on the alumina surface replace two oxygens bound to the silica or two oxygens bound to the tungsten oxide. Thus, the silica and tungsten oxide that react with the surface of alumina form a surface phase complex. This surface phase complex is non-cyrstalline in form and exhibits properties substantially different from either bulk alumina, bulk silica, bulk tungsten oxide or mixtures thereof.

In one embodiment of this invention the so-formed composition will be such that at least a portion of the supported silica and tungsten oxide are in the form of such a non-crystalline or amorphous surface phase complex. In yet another embodiment of this invention, the amount of silica and/or tungsten oxide loading may be sufficiently high such that the silica and/or tungsten oxide exhibit bulk properties in addition to the non-crystalline surface phase complex.

In order to understand the process of this invention, it is important to understand that aluminas are porous materials. That is, there are a multitude of pores and channels from the exterior of a discrete, macroscopic particle to the interior of the particle. Consequently, the surface of an alumina particle includes all the pores and channels of said alumina and their surface area as measured by nitrogen gas adsorption according to BET theory. Thus, there is much more surface in the interior of such a discrete, macroscopic particle of alumina than on its exterior surface. In this application, "surface" is used in such an art-recognized fashion and, unless expressly stated otherwise, is not to be restricted to the physical exterior surface of a macroscopic particle of alumina.

By way of example, Engelhard reforming grade of gamma alumina has an average particle size, expressed as the diameter, of about 44 microns. The average diameter of the channels or pores after calcining this alumina at 500° C. in air is from about 70–75 Å. The average particle size of, for example, colloidal silica ranges from about 20 to 200 Å. Colloidal silica comprises colloidal size particles of silica with a hydrated surface and is generally available in the form of an aqueous slurry. These materials are available, for example, from DuPont under the trademark "LUDDX". Thus, if one mixes a colloidal slurry of hydrated silica with a reforming grade of particulate alumina with sufficient water present to completely wet the pores of the alumina, one will obtain, on drying, a composite which one can ideally represent as large spheres of alumina having holes and channels dispersed through the alumina of a diameter of about 70–75 Å, with spheres of silica on the external surface of said large particle of alumina wherein the silica spheres or hydrated silica spheres may have an average diameter of about 200 Å.

In such a case the particle size of the silica is too large to fit into the pores and channels of the alumina. Therefore, the silica particles are present on the exterior surface of the alumina. The amount of silica present can be such that each particle of silica is ideally considerably separated from the next nearest particle of silica or so much silica can be present that the particles of silica completely cover the surface of the alumina. In this composite which is merely dried, but not steamed, the silica has essentially not reacted with the surface hydroxyls of the alumina.

One can readily envision that when such a composite is steamed, what will initially happen will be that the silica and tungsten oxide will react with the surface hydroxyls present on the exterior surface of the alumina at that point of intimate contact between each particle of silica and tungsten oxide and the alumina surface. Thus, one can, under the right conditions of loading and particle size difference, obtain a composite comprising discrete particles of silica and tungsten oxide a portion of which has reacted with the exterior surface hydroxyl groups of the alumina and is bound therefore to the exterior surface of the alumina. Such a composite will exhibit properties of both bulk alumina and bulk silica and bulk tungsten oxide. At this point, if the steaming treatment continues, the silica and tungsten oxide will start to spread out over the surface of the alumina essentially in the form of a monolayer or surface phase complex, including penetration into the internal pores and channels of the alumina. One can envision that in the initial phases of this wetting, dispersing and reacting of the silica and tungsten oxide with the surface hydroxyls of the alumina, that one will reach the point where particles of bulk silica and bulk tungsten oxide rest or are supported on the surface phase complex of silica and tungsten oxide on the alumina such that if the steaming treatment were to be stopped at this point one would have a composition exhibiting the properties of bulk alumina, bulk silica and tungsten oxide and a surface phase silica and tungsten oxide complex which has properties different from both bulk silica, bulk tungsten oxide, and bulk alumina.

If the steaming treatment is continued, then all of the silica and tungsten oxide will ultimately essentially spread out, wet and disperse over both the exterior and interior surface of the alumina. If the initial silica and tungsten oxide loading is sufficiently low, then one will obtain a composite comprising discrete areas of the surface phase complex of silica and of tungsten oxide which have reacted with the alumina hydroxyls interspersed with areas of alumina which have not been wet by and reacted with the silica and tungsten oxide due to an insufficient amount of silica and tungsten oxide on the alumina when the process started. In such a case, one will have a composite which exhibits properties of both bulk alumina and the surface phase silica and tungsten oxide complex which has properties different from either bulk alumina, bulk silica or bulk tungsten oxide.

On the other hand, if the silica and tungsten oxide loading is sufficient, then one can obtain a composite wherein essentially all of the alumina surface is covered by and supports the surface phase silica and tungsten oxide complex so that the resulting composite exhibits properties different from both bulk silica, bulk tungsten oxide, and bulk alumina. By way of example, if the alumina has a total BET surface area of about 200 m²/g, the amount of silica and tungsten oxide required to get what one may term to be essentially a saturation monolayer coverage of silica and tungsten oxide on the alumina support would be equivalent to about 10 wt. % silica or 1.67 millimole of $SiO_2$ per gram of alumina. A silica and tungsten oxide monolayer would contain a total of 1.67 millimoles total of $SiO_2$ and $WO_3$ on the alumina support to form the total silica-tungsten oxide-alumina composite. To carry this progression further, if the silica and tungsten oxide loading is above that required to achieve saturation monolayer coverage, then it becomes immediately obvious that one will have alumina whose surface is covered with saturation monolayer surface phase silica and tungsten oxide complex which in turn supports discrete areas of bulk silica, tungsten oxide, or particles of a $WO_3$-$SiO_2$ mixed oxide phase. In this case the composite would exhibit properties of the surface phase complex and those of bulk silica, bulk tungsten oxide and possibly those of the $WO_3$-$SiO_2$ mixed oxide at the same time. Finally, to arrive at the final and logical conclusion of the process of this invention, if the initial silica and tungsten oxide loading is sufficiently high then one will ultimately achieve a composite wherein the silica and tungsten oxide has completely spread out and wet the surface of the silica and tungsten oxide but wherein sufficient silica and tungsten oxide is present that the composite contains the tungsten oxide-silica surface phase complex with a large component of $SiO_2$, $WO_3$, and mixed $WO_3$-$SiO_2$ particles partially covering the surface phase complex.

Thus, one can readily understand from the above discussion, that the final composition will be a function of the many variables set forth under SUMMARY OF THE INVENTION, which includes (i) the time, temperature and steam content of the steaming treatment; (ii) the relative particle sizes of the tungsten oxide, silica and alumina; (iii) the silica and tungsten oxide loading or amount of silica and tungsten oxide relative to the amount of alumina surface area employed; (iv) the porosity of the alumina, and (v) the nature of the silica or silica precursor and the tungsten oxide or tungsten oxide percusor.

With regard to the relative particle sizes of the silica and tungsten oxide or silica and tungsten oxide precursor and the alumina, the above discussion relating to the use of, for instance, an Engelhard reforming grade of gamma alumina having an average diameter of about 44 microns which corresponds to a mesh size of 325 (Tyler) results in the various compositions that can be made employing the process of this invention. On the other hand, when a reforming grade of gamma alumina was employed in the process of this invention having a mesh size of 60 (Tyler) which corresponds to an average particle diameter of 250 microns, ESCA analysis found that when this was slurried with silica with sufficient water to wet the pores of the alumina, the silica did not diffuse significantly into the pores of the 60 mesh alumina material. Thus, even after a 32 hour steam treatment at 870° C. employing 90% steam with 10% $N_2$, the atomic percent of alumina as measured by ESCA was only 17. It has been found that this value is similar to that expected for a composition employing gamma alumina and silica and tungsten oxide in the form of a "colloidal silica" slurry wherein the silica and tungsten oxide has been found to be entirely on the exterior surface of the alumina particle. Thus, this gives rise to the conclusion that the silica surface diffusion or dispersion is relatively sluggish when diffusion or dispersion over significant geometric distances is required.

Thus, where it is desired to make relatively large mesh size alumina materials such as pills or extrudates, which are subsequently reacted with the silica with a subsequent high temperature steaming step, the composite will have to be formed before the particles are compacted into larger mesh size composites, such as pills or extrudates. A 1/16 inch alumina extrudate was slurried with a "colloidal silica" slurry and then steamed in an attempt to disperse the silica into the extrudate. This material was made and comprised a thin outer coating of silica from the "colloidal silica" slurry. This thin outer coating was removed by gentle abrasion with a sharp metal blade, and then analyzed by ESCA. No silica could be detected by the ESCA for this extrudate outer surface with the silica coating removed. In general, it has been found that alumina particle sizes of about 80 microns or smaller are suitable for the process of this invention. Compositions made by the process of this invention in the form of larger particles or extrudates may be formed by spray drying, tableting or extruding composites which contain a mixture of the alumina and silica and tungsten oxide which has not yet been steamed. Once these larger particles are formed, the silica and tungsten oxide is then dispersed to form a composition by the process of this invention via the high temperature steaming in a non-reducing environment or atmosphere.

The amount of steam employed in forming the compositions of this invention may vary over a wide range, i.e., from less than about 1% to more than 90% of the non-reducing steaming environment. Compositions of this invention have been made employing as little as 3% steam to as much as 90% steam. In general, the more steam that is employed the faster will be the reaction of the silica and tungsten oxide with the alumina surface.

In general, the loading levels of the silica and tungsten may be such that the combined amount of silica and tungsten oxide will range from about 1-50 wt. % of the total composition, with the $WO_3$ loading range from about 1-25 wt. % of the total composition and the silica loading ranging from about 1-50 wt. % of the total composition. Preferably the amount of $WO_3$ or silica will be present in an amount of from about 1 to 20 wt. % of the total composition, more preferably from about 2-10 wt. % and most preferably from about 4-8 wt. %.

It is to be noted that the process of this invention of dispersing the mixture of tungsten oxide and silica onto the surface of alumina by the high temperature steam treatment in a non-reducing atmosphere onto alumina will not work with oxides or oxide salt precursors of, for example, titanium, zirconium, hafnium, vanadium, niobium, tantalum and chromium. That is, none of these oxides or oxide precursors will disperse onto the surface of alumina via the high temperature steam treatment process of this invention.

In the process of this invention, the silica source may be colloidal silica in the form of an aqueous slurry or particles of silicic acid which is a form of hydrated silica. Alternatively, if convenient, the silica source may also be in the form a suitable, insoluble silica precursor material such as silicon tetraacetate, silicon acetal, silicon acetonate, silicon oxylate, etc. By insoluble silica precursor material is meant a silicon compound which is insoluble both in water and in both polar and non-polar solvents ranging from acetone, ethanol, or methanol, ketones, aldehydes, cyclic ketones, hydrocarbons, etc. The important requirement is that the precursor material be one which, when subjected to the steaming treatment in the non-reducing atmosphere, fairly readily converts to silica under the conditions of the steaming treatment.

One embodiment, the tungsten oxide source may be solid particles of tungsten oxide or particles of tungstic acid, which is a form of hydrated tungsten oxide or mixture thereof. In another embodiment, the tungsten oxide source may be in the form of a more conventional tungsten oxide source such as a soluble tungsten oxide precursor salt illustrated by ammonium meta tungstate, a solution of which can be impregnated onto the alumina surface before, after or simulataneously with the silica. In this case the high temperature steaming rapidly converts the tungsten oxide precursor salt to tungsten oxide. In yet another embodiment, the tungsten oxide source can be a mixture of both of the foregoing, the choice being left to the practitioner.

The invention will be more readily understood by reference to the Examples below:

EXAMPLES

Experimental Section

A number of catalysts of this invention were evaluated for gas oil cracking activity in a micro activity test unit (MAT) modified to allow for water (steam) addition along with the feed. The MAT unit is recognized in the industry as a standard diagnostic test unit for cat cracking catalysts [see Ciapetta, F. G. and Henderson, D. J., Oil and Gas J 65 (72), 88, (1967) and Gustofson, W. R., Div. of Pet. Chem, ACS, Preprints 14, B46 (1969)].

The oil feed was an East Texas Light Gas Oil having a boiling range of from 450°–700° F. The operating conditions for the test were:

$H_2O$ to Oil mole ratio=3/1;
Temp. (Catalyst) 900° F. (482° C.);
Pressure 1 atmosphere;
(WHSV) oil 8hr$^{-1}$ (weight hourly space velocity).

The information obtained from the tests was the overall vol. % of conversion (Micro Activity Test Number or MAT Number) and the amount of conversion to 400−°F. liquids (naphtha or gasoline).

EXAMPLE 1

In this example 3 wt. % $WO_3$ and 6 wt. % $WO_3$ on $\gamma$-$Al_2O_3$ samples were prepared for comparison to mixed $WO_3$-$SiO_2$ on $\gamma Al_2O_3$ catalysts where the $SiO_2$ precursor was a colloidal $SiO_2$ ("LUDOX" AS-40 DuPont trade name). The preparations of 3 wt. % $WO_3$ and 6 wt. % $WO_3$ on $\gamma$-$Al_2O_3$ were carried out by contacting the $\gamma$-$Al_2O_3$ support (Engelhard Industries, reforming grade) with ammonium meta-tungstate (Sylvania, Inc.) in sufficient water to fill the pore volume of the support. The impregnating solution was removed by drying at 120° C. for 16 hrs. The samples were then calcined at 500° C. and then steamed at 870° C. for 16 hours in 90% $H_2O$-10% $N_2$ in a vertical tube furnace. The catalytic cracking activity tests of these samples were performed on a modified Micro Activity Test (MAT) unit described in the Experimental Section. The MAT activities of the 3 and 6 wt. % $WO_3$ on $\gamma$-$Al_2O_3$ samples were 19 and 24, respectively. Also, the conversion to liquids of these two samples were 1.5 and 5.9 wt. % based on feed, respectively. These results will be useful for comparison to other catalysts of the instant invention, see Table 1.

In addition to the above samples, a portion of the alumina support used to prepare the $WO_3$ on $\gamma$-$Al_2O_3$ samples of this example was steam treated at 870° C. as described for the $WO_3$ on $Al_2O_3$ samples. The MAT activity of this sample was 17 and the conversion to liquids was 1.8 wt. % based on feed. This example serves to demonstrate that the 3% $WO_3$ on $\gamma$-$Al_2O_3$ catalyst of this example has similar activity and selectivity to liquid as the alumina support itself. This result will be useful for comparison to other examples of the instant invention, see Table 1.

EXAMPLE 2

In this example 3 wt. % and 6 wt % $WO_3$ on $\gamma$-$Al_2O_3$ samples were prepared and steam treated as described in Example 1 except that the $\gamma$-$Al_2O_3$ (Engelhard Industries, reforming grade) had been calcined at 1000° C. in order to convert the $\gamma$-$Al_2O_3$ to $\theta$-$Al_2O_3$ of 100 m2/g surface area. The catalytic cracking activity tests of these samples were performed as described in Example 1. The MAT activities of the 3 and 6 wt. % $WO_3$ on $\theta$-$Al_2O_3$ samples were 26 and 30, respectively. Also, the conversion to liquids of these two samples were 7.6 and 9.0 wt. % based on feed, respectively. This example serves to demonstrate that pre-calcination of the $\gamma$-$Al_2O_3$ to convert it to $\theta$-$Al_2O_3$ improves the MAT activity conversion to liquids compared to the samples prepared on $\gamma$-$Al_2O_3$ of Example 1. These results will be useful for comparison to other catalysts of the instant invention, see Table 1.

EXAMPLE 3

In this Example, 3.4wt. % $SiO_2$, 6 wt. % $SiO_2$, and 10 wt. % $SiO_2$ on $\gamma$-$Al_2O_3$ samples were prepared for comparison to mixed $WO_3$-$SiO_2$ on $\gamma$-$Al_2O_3$ catalysts where the $SiO_2$ precursor uses a colloidal $SiO_2$ ("LUDOX" AS-40 DuPont trade name). These samples were prepared by contacting the $\gamma$-$Al_2O_3$ support (Engelhard Industries, reforming grade) with "LUDOX" in sufficient water to fill the pore volume of the support. The impregnating solution was removed by drying at 120° C. for 16 hrs. The dried samples were then steamed at 870° C. for 16 hrs. in 90% $H_2O$-10% $N_2$ in a vertical tube furnace. The catalytic cracking activity tests were performed as described in Example 1.

The MAT activities of the 3.4, 6, and 10 wt. % $SiO_2$ on $\gamma$-$Al_2O_3$ samples were 21, 25 and 26, respectively. Also, the conversion to liquids of these three samples were 3.5, 5.5, and 6.3 wt. % based on feed, respectively. These results will be useful for comparison to other catalysts of the instant invention, see Table 1.

EXAMPLE 4

In this Example, the following mixed $WO_3$-$SiO_2$ on $\gamma$-$Al_2O_3$ catalysts were prepared: 3 wt. % $WO_3$ and 4 wt. % $SiO_2$ on $\gamma$-$Al_2O_3$ (Sample A), 3 wt. % $WO_3$ and 6 wt. % $SiO_2$ on $\gamma$-$Al_2O_3$ (Sample B), 3 wt. % $WO_3$ and 10 wt. % $SiO_2$ on $\gamma$-$Al_2O_3$ (Sample C). The preparations were all carried out by contacting the $\gamma$-$Al_2O_3$ support (Engelhard Industries, reforming grade) with ammonium meta-tungstate and "LUDOX" AS-40 in sufficient water to fill the pore volume of the support. The impregnating solution was removed by drying at 120° C. for 16 hrs. The samples were then steamed at 870° C. for 16 hrs. in 90% $H_2O$-10% $N_2$ in a vertical tube furnace in order to activate the catalysts of the instant invention.

The catalytic cracking activity tests of these samples were performed as described in Example 1. The MAT 1. The comparative results in the previous four examples are summarized in Table 1.

TABLE 1

MAT Activity and Liquid Selectivity
For Samples Steamed At 870° C. in Examples 1-5

| Example No. | Sample | MAT Activity | Liquid Selectivity (Wt. % on Feed) |
|---|---|---|---|
| 1 | γ-$Al_2O_3$ | 17 | 1.7 |
| 1 | 3 wt. % $WO_3$ on γ-$Al_2O_3$ | 19 | 1.5 |
| 1 | 6 wt. % $WO_3$ on γ-$Al_2O_3$ | 24 | 5.9 |
| 2 | 3 wt. % $WO_3$ on θ-$Al_2O_3$ | 26 | 7.6 |
| 2 | 6 wt. % $WO_3$ on θ-$Al_2O_3$ | 30 | 9.0 |
| 3 | 3.4 wt. % $SiO_2$ on γ-$Al_2O_3$ | 21 | 3.5 |
| 3 | 6 wt. % $SiO_2$ on γ-$Al_2O_3$ | 25 | 5.5 |
| 3 | 10 wt. % $SiO_2$ on γ-$Al_2O_3$ | 26 | 6.3 |
| 4 | 3 wt. % $WO_3$ and 4 wt. % $SiO_2$ on γ-$Al_2O_3$ | 30 | 10.8 |
| 4 | 3 wt. % $WO_3$ and 6 wt. % $SiO_2$ on γ-$Al_2O_3$ | 33 | 11.6 |
| 4 | 3 wt. % $WO_3$ and 10 wt. % $SiO_2$ on γ-$Al_2O_3$ | 36 | 14.7 |
| 5 | 3 wt. % $WO_3$ and 2 wt. % $SiO_2$ on θ-$Al_2O_3$ | 32 | 10.7 |
| 5 | 3 wt. % $WO_3$ and 4 wt. % $SiO_2$ on θ-$Al_2O_3$ | 33 | 11.8 |
| 5 | 3 wt. % $WO_3$ and 6 wt. % $SiO_2$ on θ-$Al_2O_3$ | 32 | 10.7 |
| 5 | 3 wt. % $WO_3$ and 10 wt. % $SiO_2$ on θ-$Al_2O_3$ | 24 | 5.8 | activities of Samples A, B and C were 30, 33, 36, respectively. Also, the conversion to liquids of Samples A, B, and C were 10.8, 11.6, and 14.7 wt. % based on feed respectively. It is to be noted that the mixed $WO_3$-$SiO_2$ catalysts of this example have superior activity and selectivity to liquid products compared to the 3 wt. % $WO_3$ and various $SiO_2$ catalysts of Examples 1 and 3. This demonstrates the superior performance of mixed $WO_3$-$SiO_2$ catalysts compared to either of the separate components catalysts (see Table 1). Also, this example serves to demonstrate the ability to prepare active cracking catalysts by steam treatment of mixed $WO_3$-$SiO_2$ on γ-$Al_2O_3$ samples where the silica precursor is colloidal $SiO_2$.

EXAMPLE 5

In this Example, a series of mixed $WO_3$-$SiO_2$ on γ-$Al_2O_3$ catalysts were prepared and steam treated as described in Example 4 on γ-$Al_2O_3$ which had been calcined at 1000° C. as described in Example 2. The following samples were prepared: 3 wt. % $WO_3$ and 2 wt. % $SiO_2$ on γ-$Al_2O_3$ (Sample A), 3 wt. % $WO_3$ and 4 wt. % $SiO_2$ on γ-$Al_2O_3$ (Sample B), 3 wt. % $WO_3$ and 6 wt. % $SiO_2$ on γ-$Al_2O_3$ (Sample C), and 3 wt. % $WO_3$ and 10 wt. % $SiO_2$ on γ-$Al_2O_3$ (Sample D). The catalytic cracking activity tests of these samples were performed as described in Example 1. The MAT activities of Samples A, B, C, and D were 32, 33, 32 and 24, respectively. The conversion to liquids of Samples A, B, C and D were 10.7, 11.8, 10.7, and 5.8 based on feed, respectively.

One can conclude from these results, in general, that preparation of mixed $WO_3$-$SiO_2$ catalysts on a pre-calcined γ-$Al_2O_3$ support produces catalysts with superior activity and selectivity to liquid products compared to the 3 wt. % $WO_3$ $SiO_2$-containing catalysts of Examples 2 and 3.

This experiment also demonstrates that there are preferred limits to obtain maximum activity and liquid selectivity. This can be seen by the decline in activity and selectivity to liquids for Sample D compared to Samples A, B and C of this example.

Finally, this experiment serves as a comparison to the superior performance of the 3% $WO_3$ and 10% $SiO_2$ on γ-$Al_2O_3$ samples of Example 4 compared to all the samples of this Example prepared on θ-$Al_2O_3$, see Table 1.

EXAMPLE 6

In this Example, 6 wt. % $WO_3$ and 6 wt. % $SiO_2$ on γ-$Al_2O_3$ (Sample A) and 6 wt. % $WO_3$ and 10 wt. % $SiO_2$ on γ-$Al_2O_3$ (Sample B) were prepared and steam treated as described in Example 4. The catalytic cracking activity tests of these samples were performed as described in the Experimental Section. The MAT activities of Samples A and B were 45 and 36 respectively. The conversion to liquids of Samples A and B were 15.4 and 15.5 based on feed, respectively. One can conclude from these results that 6 wt. % $WO_3$ catalysts of this example have similar liquid selectivities to the 3 wt % $WO_3$ and 10 wt. % $SiO_2$ on γ-$Al_2O_3$ catalyst Sample C of Example 4. This example serves to demonstrate that 3 wt % $WO_3$ combined with an optimum $SiO_2$ content have cracking performance which rivals that of a catalyst with a higher $WO_3$ content. This example further serves to demonstrate that a lower $SiO_2$ content is more active than a higher $SiO_2$ content for a sample containing 6 wt. % $WO_3$.

EXAMPLE 7

In this Example, a 3 wt. % $WO_3$ and 15 wt % $SiO_2$ on γ-$Al_2O_3$ sample was prepared. A 15 wt. % $SiO_2$ on γ-$Al_2 O_3$ sample was prepared and steam treated as described in Example 3. To this sample 3 wt. % $WO_3$ was added by impregnation of ammonium meta-tungstate in sufficient water to fill the pore volume of the support. This impregnating solution was removed by drying at 120° C. for 16 hrs. The sample was then calcined at 500° C. for 16 hrs. and then steamed at 870° C. for 16 hrs. in 90% $H_2O$-10% $N_2$ in a vertical tube furnace. The catalytic cracking activity tests of these samples were performed as described in Example 1. The MAT activity of this 3% $WO_3$ and 15% $SiO_2$ on γ-$Al_2 O_3$ samples and the 15% $SiO_2$ on γ-$Al_2 O_3$ sample were 37 and 26, respectively. The conversion to liquids of these samples were 14.7 and 10.5 wt. % based on feed respectively. This example serves to demonstrate that addition of $WO_3$ to a high silica loaded γ-$Al_2 O_3$ catalyst enhances the MAT activity and liquid selectivity compared to the sample with silica alone.

A portion of the 3% $WO_3$ on 15% $SiO_2$ on γ-$Al_2 O_3$ sample of this example which had been steam treated at 870° C. for 16 hrs. was steam treated at 927° C. for an additional 16 hrs. as described in this example. The MAT activity of this sample was 39 and the conversion to liquids was 16.0 wt. % based on feed. This result confirms the remarkable, steam stabilaity of the $WO_3$ $SiO_2$ on $\gamma$-$Al_2O_3$ catalysts of the instant invention.

In order to compare the 3 wt. % $WO_3$ and 15 wt. % $SiO_2$ on $\gamma$-$Al_2O_3$ catalyst of this example made by the sequential procedure on $\gamma$-$Al_2O_3$ with a catalyst obtained employing a single impregnation procedure, a sample was prepared, in one impregnation step by the procedure described in Example 3. The sample was steam treated at 870° C. as described in Example 1. The MAT activity of this sample was 37 and the conversion to liquids was 13.4 wt. % based on feed. This experiment demonstrates that active cracking catalysts can be prepared by either a one step preparation or by sequential procedure where a tungsten precursor and colloidal silica were contacted with a $\gamma$-$Al_2O_3$ support.

EXAMPLE 8

In this example a portion of the unsteamed 6 wt. % $WO_3$ and 6 wt. % $SiO_2$ on $\gamma$-$Al_2O_3$ (Sample A) of example 6 was treated in He at 870° C. for 16 hrs. The MAT activity of this He treated sample was 23 with a conversion to liquids of 6.4 wt. % based on feed. This example demonstrates the inferior catalytic performance of a $WO_3$-$SiO_2$ on $\gamma$-$Al_2O_3$ catalyst composite treated in a non-reducing environment at high temperature without steam being present, see Example 6 for comparison. The He treated sample of this example, in fact, has catalytic activity and selectivity to liquids very similar to the 6 wt. % $WO_3$ on $\gamma$-$Al_2O_3$ sample of Example 1.

EXAMPLE 9

In this Example, 3 wt. % $WO_3$ and 6 wt. % $SiO_2$ on $\gamma$-$Al_2O_3$ (Sample A) and 6 wt. % $WO_3$ and 6 wt. % $SiO_2$ and $\gamma$-$Al_2O_3$ (Sample B) samples were prepared using $H_2WO_4$ (Alfa Inorganic) as the tungsten precursor and silicic acid (Matheson, Coleman, and Bell) as the silica precursor. As both of these materials are essentially insoluble in water the catalysts were made by mixing the precursor salts in with the $\gamma$-$Al_2O_3$ and ball-milling the mixture for 15 minutes to insure thorough contacting. As an example of the preparation of these catalyst samples 0.97 g of $H_2WO_4$ and 2.34 g silicic acid were added to 27.3 g of $\gamma$-$Al_2O_3$ (Engelhard Industries, reforming grade) for the 3 wt. % $WO_3$ and 6 wt. % $SiO_2$ or $\gamma$-$Al_2O_3$ preparation. The powder mixtures were then steam treated as described in Example 3. The catalytic cracking tests were performed as described in Example 1. The MAT activities of Samples A and B were 36 and 35, respectively. The conversion to liquids of Samples A and B were 14.3 and 15.0 wt. % based on feed. This example demonstrates that $WO_3$-$SiO_2$ on $\gamma$-$Al_2O_3$ cracking catalysts can be prepared by physical mixtures of insoluble tungsten and silica precursor salts with $\gamma$-$Al_2O_3$ followed by steam treatment. This example also demonstrates that the 3% $WO_3$-6% $SiO_2$ on $\gamma$-$Al_2O_3$ catalyst of this example is superior to the analogous catalyst of Example 4 prepared using a soluble tungsten precursor and a colloidal silica precursor. Also, the selectivity to liquids of the 6% $WO_3$-6% $SiO_2$ on $\gamma$-$Al_2O_3$ catalyst of this example is comparable to the analogous catalyst of Example 6 prepared by a different experimental procedure.

EXAMPLE 10

In this Example, a 6 wt. % $WO_3$ and 5 wt. % $SiO_2$ on $\gamma$-$Al_2O_3$ sample was prepared as described in Example 9. Two portions of this sample were treated at two different conditions in order to activate the samples. They were; (a) steam 1 hr. at 760° C. as described in Example 3 (Sample A) and (b) steam 1 hr. at 870° C. as described in Example 3 (Sample B). The catalytic cracking activity tests of these samples were performed as described in Example 1. The MAT activities of Samples A and B were 35 and 39, respectively. The conversion to 400−liquids of Samples A and B were 13.5 and 12.4, respectively. This example serves to demonstrate that active $WO_3$-$SiO_2$ on $\gamma$-$Al_2O_3$ cracking catalysts can be prepared using insoluble precursor salts. This example also shows that the catalysts of the instant invention can be activated by steam treatment at 760° C. or 870° C. for a 1 hr. steam treatment period.

EXAMPLE 11

This experiment illustrates that a ball-milled physical mixture of tungstic acid, $H_2WO_4$, (Alfa Inorganic) and gamma-alumina does not give the catalytic activity of such a mixture steamed at high temperature prior to use. In this experiment, a physical mixture of tungstic acid and -$Al_2O_3$ powder were ball-milled in a glass jar for 15 minutes using alumina grinding balls to insure an intimate mixture of the two powders. The tungsten oxide content of the mixture was 10 wt. % This tungstic acid material was a highly crystalline material with a particle size <325 mesh. The -$Al_2O_3$ was a reforming grade alumina obtained from Engelhard Industries, Inc. with a particle size <325 mesh with a surface area of 220m$^2$/g. A five gram sample of this ball-milled powder mixture was put in the MAT unit and the reaction was carried out with the gas oil feed as previously described. The MAT activity of this sample was 22 with a conversion of 400− liquids of 2.9 wt. %. Another portion of the tungstic acidalumina powder mixture of this example was steamed at 870° C. for 16 hrs. in 90% $H_2O$-10% $N_2$. The MAT activity of this steamed powder mixture was 45 with a liquid yield of 16.5 wt. %.

This experiment serves to demonstrate that steam treatment of a physical mixture of a tungsten oxide salt and -$Al_2O_3$ results in doubling of the MAT activity and increases the liquid yield by a factor of five compared to the unsteamed physical mixture.

EXAMPLE 12

This experiment was similar to Example 11, except that the powder mixture contained on 1 wt. % tungsten oxide (present as $H_2WO_4$) and $\gamma$-$Al_2O_3$. An unsteamed sample of this mixture following ball-milling as described in Example 11 had a MAT activity of 22 and a conversion to 400−°F. liquids of 1.1 wt. % based on feed.

This example demonstrates that the tungsten oxide content of an unsteamed catalyst does influence the extremely low liquid conversion of the unsteamed sample of Example 11, but does not influence the MAT activity. This further shows that there is a modest catalytic activity introduced by the dry mixing of $H_2WO_4$ and $\gamma$-$Al_2O_3$ but that this activity is much less than that obtained by a steam treatment at elevated temperature.

EXAMPLE 13

In this example, a portion of the ball-milled 10 wt. % tungsten oxide (present as $H_2WO_4$) and $Al_2O_3$ sample of Example 11 was heated in helium for 16 hrs. at a temperature of 870°F. to form a catalyst of the instant invention. The MAT activity of this thermally-treated sample was 41 with a conversion to 400— liquids of 16.2 wt. % based on feed.

What is claimed is:

1. As a composition of matter, a compound prepared by (i) forming a composite of a mixture of (a) tungsten-containing particles selected from the group consisting of tungsten oxide, tungstic acid, tungsten compounds capable of being converted to tungsten oxide when treated with steam, and mixtures thereof, (b) silicon-containing particles selected from the group consisting of silica, silicic acid and silicon compounds insoluble in polar and non-polar solvents and which are capable of being converted to silica when treated with steam in a non-reducing atmosphere and (c) particles of porous alumina, and (ii) steaming said composite at an elevated temperature of at least about 500° C. in a non-reducing environment and in the presence of steam for a time sufficient for at least a portion of the tungsten oxide and silica to react with the alumina surface.

2. The composition of claim 1 wherein at least a portion of the tungsten oxide has dispersed over the alumina surface.

3. The composition of claim 2 wherein at least a portion of the silica has dispersed over the alumina surface.

4. The composition of claim 3 wherein the combined amount of silica and tungsten oxide ranges from between about 1-50 wt. % of the total composition.

5. The composition of claim 4 wherein the elevated temperature employed in forming said composition is at least about 700° C.

6. The composition of claim 5 wherein the amount of steam employed in forming the composition ranges between from about 1-90% of the non-reducing environment.

7. A process for preparing a composition comprising a mixture of silica and tungsten oxide supported on the surface of alumina comprising (i) forming a composite of a mixture of (a) tungsten-containing particles selected from the group consisting of tungsten oxide, tungstic acid, tungsten compounds capable of being converted to tungsten oxide when treated with steam, and mixtures thereof, (b) silicon-containing particles selected from the group consisting of silica, silicic acid and silicon compounds insoluble in polar and non-polar solvents and which are capable of being converted to silica when treated with steam in a non-reducing atmosphere and (c) particles of porous alumina, and (ii) steaming said composite at an elevated temperature of at least about 500° C. in a non-reducing environment and in the presence of steam for a time sufficient for at least a portion of the tungsten oxide and silica to react with the alumina surface.

8. The process of claim 7 wherein said steaming of said composite is continued for a time sufficient for at least a portion of the tungsten oxide has dispersed over the alumina surface.

9. The process of claim 8 wherein said steaming is continued for a time sufficient for at least a portion of the silica has dispersed over the alumina surface.

10. The process of claim 9 wherein the combined amount of silica and tungsten oxide ranges from between about 1-50 wt. % of the total composition.

11. The process of claim 10 wherein the composite is steamed at an elevated temperature of at least about 700° C.

12. The process of claim 11 wherein the amount of steam employed ranges between from about 1-90% of the non-reducing environment.

* * * * *